United States Patent [19]
Sarrantonio

[11] Patent Number: 4,678,141
[45] Date of Patent: Jul. 7, 1987

[54] AIRCRAFT LAUNCHER AND RETRIEVER
[75] Inventor: August C. Sarrantonio, Huntington Station, N.Y.
[73] Assignee: Grumman Aerospace Corporation, Bethpage, N.Y.
[21] Appl. No.: 892,452
[22] Filed: Aug. 4, 1986

Related U.S. Application Data

[63] Continuation of Ser. No. 243,767, Mar. 16, 1981, abandoned.

[51] Int. Cl.⁴ .......................... B64C 37/02; B64D 5/00
[52] U.S. Cl. .......................................... 244/2; 244/63
[58] Field of Search .................... 244/2, 3, 63, 100 A, 244/137 R, 137 A

[56] References Cited

U.S. PATENT DOCUMENTS

| 2,472,947 | 6/1949 | Hlobil | 244/100 R |
|---|---|---|---|
| 2,550,380 | 4/1951 | Redford | 244/135 R |
| 2,591,913 | 4/1952 | Bowers | 244/135 R |
| 2,653,777 | 9/1953 | Barkey | 244/2 |
| 2,780,422 | 2/1957 | Magilo, Jr. . | |
| 2,797,881 | 7/1957 | Andrews . | |
| 2,843,337 | 7/1958 | Bennett . | |
| 2,921,756 | 1/1960 | Borden et al. . | |
| 3,000,593 | 9/1961 | Eggers et al. . | |
| 3,057,586 | 10/1962 | Hornsby | 244/100 R |
| 3,058,691 | 10/1962 | Eggers et al. . | |
| 3,070,326 | 12/1962 | Griffith . | |
| 3,165,280 | 1/1965 | Lee | 244/56 |
| 3,291,242 | 12/1966 | Tinajero . | |
| 3,298,633 | 1/1967 | Dastoli et al. | 244/2 |
| 3,614,034 | 10/1971 | Townsend | 244/56 |
| 3,666,209 | 5/1972 | Taylor | 244/12.4 |
| 3,888,435 | 6/1975 | Foote . | |
| 4,116,405 | 9/1978 | Bacchi et al. | 244/12.4 |
| 4,219,171 | 8/1980 | Rudmann . | |

FOREIGN PATENT DOCUMENTS

| 901262 | 11/1953 | Fed. Rep. of Germany | 244/2 |
|---|---|---|---|
| 911457 | 4/1954 | Fed. Rep. of Germany | 244/2 |
| 1043516 | 11/1953 | France . | |
| 637801 | 5/1950 | United Kingdom | 244/2 |
| 830520 | 3/1960 | United Kingdom | 244/56 |
| 912549 | 12/1962 | United Kingdom | 244/100 R |
| 926613 | 5/1963 | United Kingdom . | |

OTHER PUBLICATIONS

"Tech Front Lines", Popular Mechanics, Sep. 1980, pp. 104-105.

Primary Examiner—Joseph F. Peters, Jr.
Assistant Examiner—Rodney Corl
Attorney, Agent, or Firm—Richard G. Geib; Daniel Jay Tick; David Aker

[57] ABSTRACT

A composite VTOL vehicle comprising a VTOL carrier with outboard mounted engines and an aircraft which is lifted off and retrieved by the carrier.

20 Claims, 5 Drawing Figures

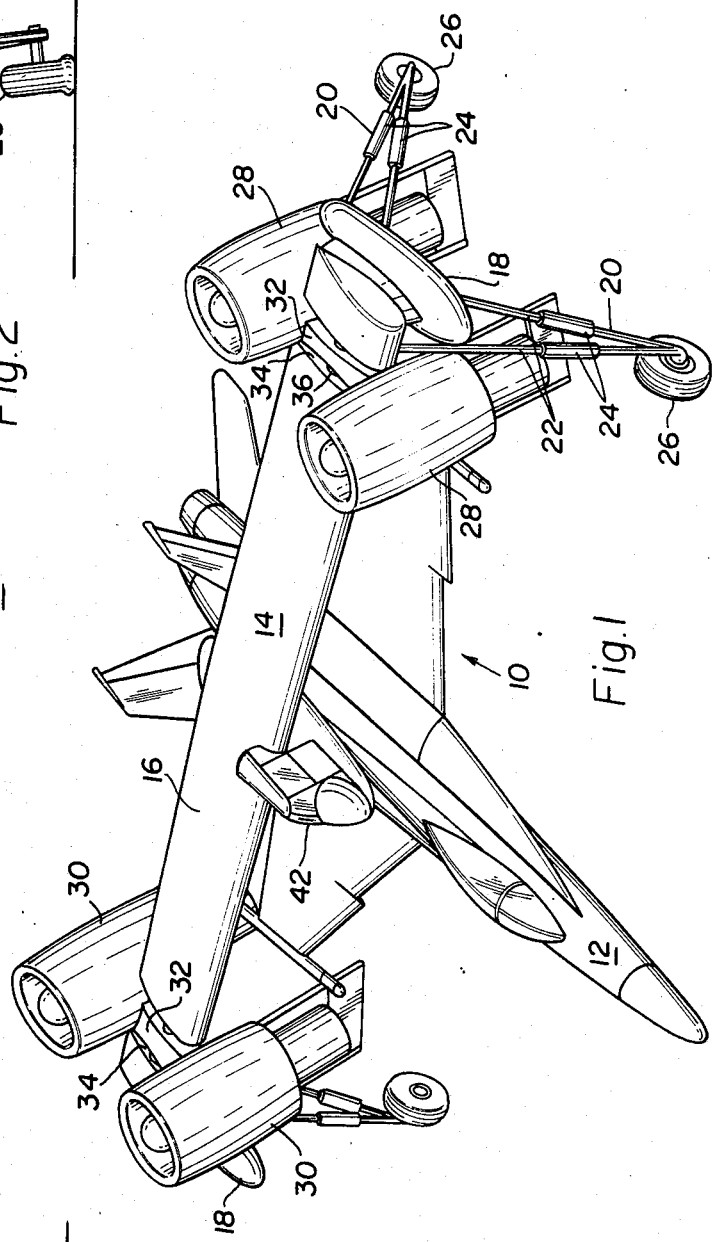
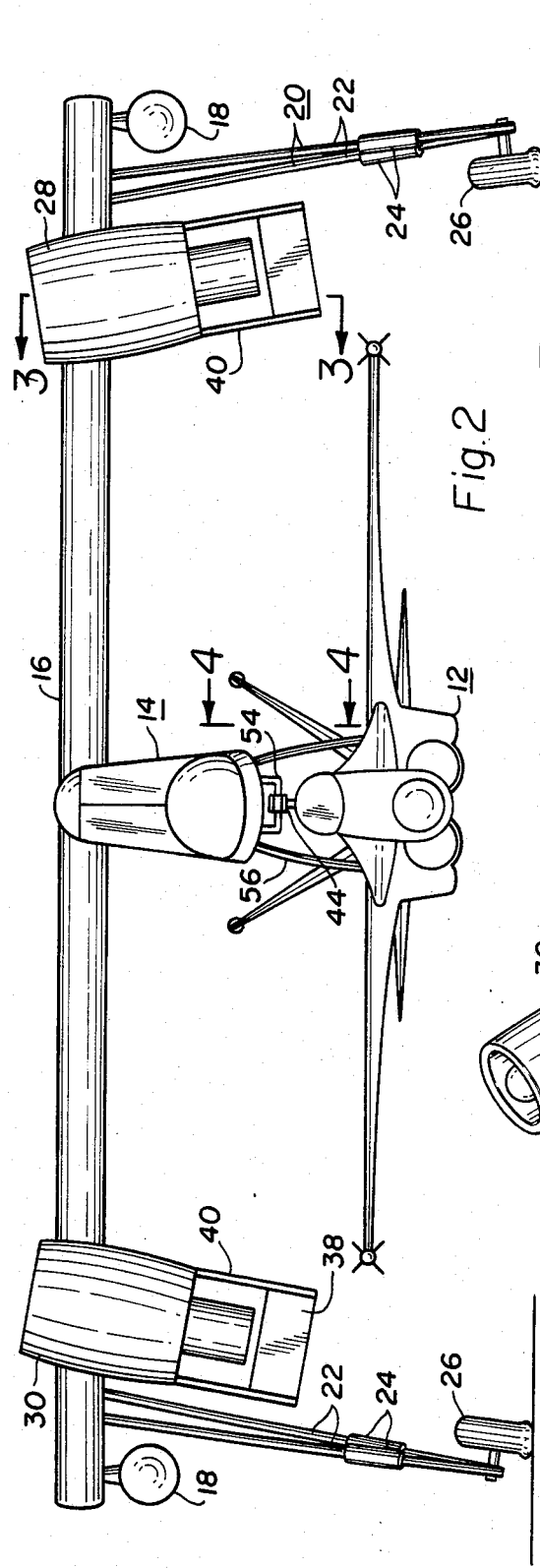
Fig.1
Fig.2

AIRCRAFT LAUNCHER AND RETRIEVER

This is a continuation of copending application Ser. No. 243,767, filed on Mar. 16, 1981, now abandoned.

BACKGROUND OF THE INVENTION

This invention relates to aircraft in general, and particularly to a vertical take-off and landing (VTOL) carrier capable of launching and retrieving any conventional fixed wing airplane, or transporting any type of other payload.

For purposes of this specification, "carrier" refers to a VTOL vehicle capable of launching and retrieving another aircraft; "aircraft" or "carried vehicle" refers to the airplane adapted to be launched and retrieved by the carrier; and "composite vehicle" refers to the combination of carrier and aircraft.

The concept of using a carrier vehicle to lift a second aircraft having greater horizontal range and speed is not new. An example of a design employing this concept is found in British Pat. No. 926,613, issued to Frederick, et al. In the Frederick, et al., design the carrier vehicle comprises an airfoil shaped body which serves both as a platform for the carried airplane and a housing for a plurality of jet engines.

One disadvantage to the Frederick, et al., platform is that the carried plane, when attached to the carrier, is directly above the carrier engines. This necessitates the provision of ductwork for the jet intakes which is both expensive and may interfere with the stability of the carried plane during separation or coupling.

A further drawback in the Frederick, et al., design is the necessity of ramps and a winch for rolling the carried plane on and off the platform while on the ground.

Several prior art designs take advantage of the lifting capability of helicopters. An example is found in U.S. Pat. No. 2,843,337, issued to Bennett. The major drawback of employing helicopter carriers is, again, that downwash from the rotary blades interferes with aircraft stability and the creation of lift prior to separation.

U.S. Pat. Nos. 3,000,593, issued to Eggers and Haberkorn; and 3,058,691, issued to Eggers, Dumey and Ernst disclose composite VTOL aircraft which attempt to overcome the problem of aerodynamic interference between the coupled vehicles by providing legs which vertically position the composite craft on the ground. Such an arrangement is undesirable in many applications because of the difficulty in landing an aircraft in a "tailsitting" position.

A further objection to most prior art schemes is the inadaptability of the carrier vehicle to an unlimited variety of fixed wing aircraft without extensive modification to the carried craft.

SUMMARY OF THE INVENTION

It is therefore a principle object of the present invention to provide a VTOL carrier vehicle capable of launching and retrieving a conventional aircraft.

A further object of the present invention is to provide an aerodynamically stable VTOL composite vehicle.

Yet another object of the present invention is to provide a VTOL composite vehicle which may be lifted off and landed from a horizontal position with respect to the ground.

A still further object of the present invention is to provide a VTOL carrier vehicle which may be used in connection with a wide variety of conventional aircraft.

These and other objects and advantages are accomplished in brief by providing a carrier vehicle comprising an aerodynamically shaped beam with outboard mounted, pivotable engines.

According to the present invetion, the carrier is further provided with an underslung centerline cabin having a retractable trapeze and latching probes for releasably attaching the aircraft to be lifted-off. Attached outboard of the engines are landing gear which allow the carrier craft to be positioned on the ground over the aircraft to be VTOLed.

Another object is to provide a carrier whose length of the aerodynamic beam and spacing of the engines of the carrier vehicle is determined by the span of the vehicle type or types it is designed for. Thus, the carrier of the present invention may be adapted for use with a variety of conventional aircraft.

Furthermore, it is an object with such aircraft that the outboard mounted engines be spaced sufficiently so that their performance is not hampered by the carried aircraft.

A still further object is to provide for control of the carrier vehicle by use of aerodynamic vanes mounted on each engine and/or asymmetrical thrust controls.

It is also an object to have the landing gear support the carrier vehicle at a sufficient height so that the carried aircraft landing gear, if included, may be extended while the coupled vehicles are parked on the ground, whereby the vehicles may then be coupled or uncoupled and moved apart for maintenance, etc.

BRIEF DESCRIPTION OF THE DRAWINGS

These and other objects and features of the invention will be apparent when viewed in connection with the accompanying drawings, in which:

FIG. 1 is an isometric view of the composite vehicle;

FIG. 2 is a front elevation view of the composite vehicle;

DETAILED DESCRIPTION OF A PREFERRED EMBODIMENT

Figure 3:
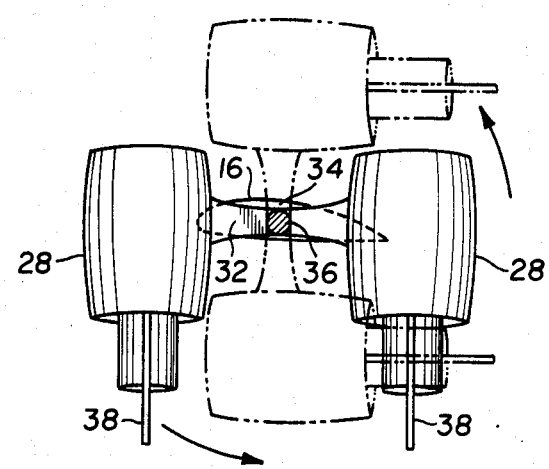
FIG. 3 is a partially cut away side elevation view taken along line 3—3 of FIG. 2.

In reference to FIG. 1, a composite vehicle 10 comprising a conventional aircraft 12 (or other type of payload) attached to the underside of a VTOL carrier 14 is shown. Aircraft 12 may be prop or jet driven, or even an unpowered glider, and may or may not include landing gear. In a preferred embodiment, the carried vehicle is a high performance, typically jet powered, aircraft without independent landing gear. Such an aircraft is designed solely to best meet the conditions of high speed flight without the burden of additional airfoil surface or apparatus normally required only for landing or slow speed flight.

As seen in FIGS. 1 and 2, the major structural component of the carrier 14 is an aerodynamically shaped beam 16. Fuel tanks are mounted on the underside of beam 16 along the outboard edges of beam 16. Just inboard of tanks 18 are mounted landing gear 20, comprising a left pair and a right pair of legs or frame members 22, shock absorbers 24 interposed along legs 22 and wheels 26 attached to the ends of legs 22. The landing gear are of sufficient height to allow aircraft 12 to clear the ground (FIG. 2). Further, the landing gear 20 are "supportively deployed" with respect to the composite vehicle 10; that is, the points of contact of wheels 26 with the ground form a large rectangle or trapezoid substantially centered about a normal line which passes through the center of gravity of vehicle 10.

Mounted near the left outboard edge of beam 16, just inboard of left side landing gear 20, is a fore and aft pair of engines 28. Engines 30 are similarly mounted near the right edge 35 of beam 16. In a preferred embodiment, engines 28 and 30 are jet engines, but any engines developing sufficient lift and capable of being pivotally mounted may be used without departing from the scope of this invention.

Engines 28 and 30 are capable of being pivoted between a first position (FIG. 3, solid lines) in which they provide substantially vertical thrust; and a second position (FIG. 3, ghost lines) in which the thrust provided is substantially horizontal. Each fore and aft engine pair is mounted, for example, to an engine mounting member 32 which is pivotally disposed in a cut out area 34 of beam 16. Engine mounts 32 are both attached to a single pivot rod 36 disposed within the beam and extending through both areas 34 and beam 16 between areas 34, so that the engine pairs pivot in unison with each other. Each engine is provided with aerodynamic vanes 38 which are pivotally mounted on booms 40 (FIG. 2) connected to each engine. A pilot of the carrier may control the pivoting of vanes on the left and right engine pairs independently of each other.

The pilot and controller of carrier 14 are housed in a center-line mounted cabin 42 below beam 16. The cabin 42 is provided with means, such as a hook and trapeze mechanism, for releasably attaching aircraft 12 to carrier 14. Means for attaching two aircraft are well known; detail of a hook and trapeze mechanism similar to the one employed in a preferred embodiment of the present invention may be found, for example in U.S. Pat. No. 2,653,777, issued to Barkey.

Figure 4:
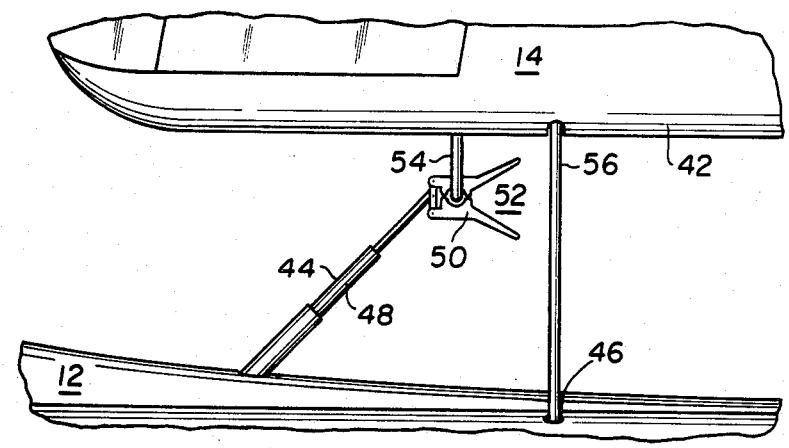
FIG. 4 is side elevation showing detail of the hook and trapeze mechanism.

Referring to FIG. 4, aircraft 12 is provided with a retractable hook member 44 and latching probe receptacles 46 arranged on an upper surface of the aircraft. Hook member 44 comprises a telescoping arm 48 and a pair of jaws 50 which form a V-shaped mouth 52.

Corresponding to hook member on aircraft 12 is a retractable trapeze 54 attached to the underside of cabin 42 of carrier 14. Corresponding with probe receptacles 46 on aircraft 12 are probes 56 attached to the underside of cabin 42.

Figure 5:
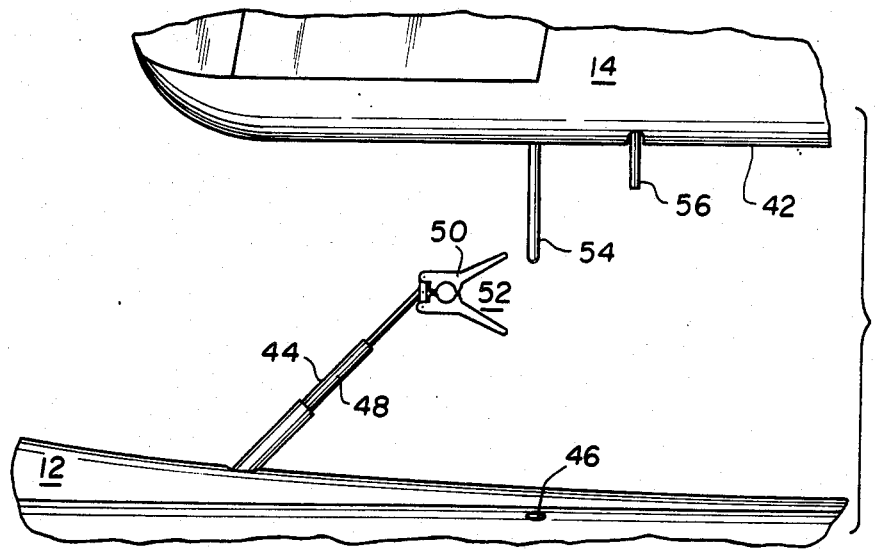
FIG. 5 is a side elevation view similar to FIG. 4, but showing the vehicle just prior to coupling.

FIG. 4 shows trapeze 54 in its retracted position, and probes 56 extended, while FIG. 5 shows trapeze 54 extended and probes 56 retracted. In the retracted position probes 56 may be stored, for example, along the interior walls of cabin 42.

The hook and trapeze mechanism and probes are arranged in supportive deployment with respect to both aircraft 12 and carrier 14. Thus, a vertical line through the center of gravity (c.g.) of aircraft 12 passes substantially through the center of a triangle formed by the hook and probe receptacles; likewise, a vertical through the c.g. of carrier 14 passes substantially through the center of a triangle formed by the trapeze and probes.

The only necessary modification to a conventional aircraft to be compatible with carrier 14 is the installation of suitable hook and probe receptacles. Depending on the wingspan of the aircraft type or types with which the carrier is to be used, the length of beam 16 should be substantially greater than the wingspan of aircraft 12. Thus, the spacing of engines 28 and 30 is chosen so that aircraft 12 may be positioned between engines 28 and engines 30. The lift capacity of engines 28 and 30 is chosen with regard to the maximum weight of aircraft 12. Legs 22 on landing gear 20 are made of sufficient length to allow aircraft 12, and its landing gear, if such independent landing gear are included, to clear a surface on which the composite vehicle is parked.

OPERATION

Carrier 14 is designed to lift aircraft 12 from a surface and accelerate aircraft 12 to a safe flying speed. Vehicles 12 and 14 are coupled at lift off, and engines 28 and 30 are in vertical thrust position (FIG. 2). On attaining a desired altitude, the engines on aircraft are started and engines 28 and 30 are tilted to their horizontal thrust position by rotating pivot rod 36. When a desired horizontal speed (in excess of the stall speed of aircraft 12) is reached, latching probes 56 are retracted and jaws 50 are separated, launching aircraft 12. By untilting its engines carrier 14 moves away from aircraft 12 in an upward direction, and may then be flown back to base to await the return of the aircraft.

Conversely, on retrieval, carrier 14 moves toward aircraft 12 from above and behind with trapeze 54 extended as shown in FIG. 5. Upon engagement of jaws 50 about trapeze 54, the trapeze is retracted, bringing the coupled vehicles closer together. Probes 56 are then deployed, establishing a three point support. The throttle of aircraft 12 is now retarded to idle, and engines 28 and 30 are untilted to their vertical thrust position to retard the forward speed of the mated pair. The composite vehicle 10 is now ready to initiate a landing at its base.

Control of the composite vehicle is accomplished by pivoting of aerodynamic vanes 38 and the utilization of asymmetrical thrust by the pilot of carrier 14. When engines 28, 30 are in their horizontal thrust position, vanes 38 are used for pitch and direction control and asymmetrical thrust between engines 28 and engines 30 provides lateral control. Pitch and lateral control are accomplished by use of vanes 38 when engines 28, 30 are vertically positioned. Cross shafting may or may not be employed, and fuel tanks 18 may be releasable to compensate for load shifts in case of an engine failure. A more detailed description of a flight control system used in a preferred embodiment of the present invention may be found in U.S. Pat. No. 4,116,405, issued on Sept. 26, 1978 to Bacchi et al and assigned to the common assignee hereof.

It is seen that the outboard mounting of engines 28 and 30 precludes interference with their operation by aircraft 12, and stable operation during launching and retrieving is thereby insured. Further, the carrier of the present invention may be used with a conventional aircraft having only minimal modification, or with a specially designed high performance aircraft unburdened by features required on conventional aircraft for low speed flight and take offs and landings.

While certain representative embodiments and details of the present invention have been laid out above for illustrative purposes, they should not be considered limiting of the scope of the invention as set out in the claims below, as various changes and modifications may be made by those skilled in the art without departing from the spirit or scope of the invention.

What is claimed is:

1. A composite VTOL vehicle comprising:
   a single aerodynamically shaped wing beam;
   a left pair and a right pair of engines mounted respectively near the left and right outboard edges of the wing beam to straddle said wing beam, said engines including pivoting means by which the engines may be pivoted between a first position in which the engines provide substantially vertical thrust to each side of the wing beam and a second position in which the engines provide substantially horizontal thrust above and below said wing beam;
   a centerline mounted cabin attached directly to the underside of the wing beam and positioned so that at least a portion thereof protrudes below said wing beam;
   an attaching means for releasably attaching an aircraft to the underside of the cabin, said attaching means being adapted to attach the aircraft to be held thereby between the engine pairs; and
   a landing gear means arranged in supportive deployment with respect to the vehicle.

2. The vehicle of claim 1, which further comprises a pair of fuel tanks mounted to the underside of the beam along the left and right outboard edges of the beam beyond the engines.

3. The vehicle of claim 1, in which the aircraft is a high performance, jet powered aircraft having no independent landing gear.

4. The vehicle of claim 1, in which the pivoting means comprises:
   left and right engine mounting members respectively mounting the left and right engine pairs, said engine mounting members being disposed respectively in left and right cut out areas of the beam; and
   a single, rotatable pivot rod disposed within the beam in an area between the cut out areas and extending through the cut out areas of the beam, said pivot rod being attached to the engine mounting members and when rotated, causing rotation thereof.

5. The vehicle of claim 1, in which the engines are provided with pivotable aerodynamic vanes capable of providing pitch and lateral control to the vehicle when the engines are in the first position, said vanes being further capable of providing pitch and directional control when the engines are in the second position.

6. The vehicle of claim 1, wherein the attaching means comprises:
   a retractable hook and two latching probe receptacles arranged in supportive deployment with respect to the aircraft on an upper surface of the aircraft; and
   a retractable trapeze and two retractable latching probes attached to the underside of the cabin, said trapeze and probes corresponding, respectively, with the hook and probe receptacles.

7. The vehicle of claim 1, in which the landing gear means is capable of supporting the vehicle at a sufficient height so that the aircraft attached to the underside of the cabin clears a surface on which the vehicle is parked.

8. The vehicle of claim 1, in which the landing gear means comprises:
   a left pair and a right pair of legs mounted respectively to the underside of the beam just outside the left pair and right pair of engines, each of said legs having a shock absorber interposed along its length; and
   a left pair and a right pair of wheels connected to the ends of the corresponding legs.

9. The vehicle of claim 1, in which the engines are capable of providing asymmetrical thrust between the left engine pair and the right engine pair.

10. The vehicle of claim 1, wherein the beam is fixed with respect to the vehicle.

11. The vehicle of claim 1, wherein the portion of the cabin protruding below said wing beam depends downward below and forward of said wing beam.

12. The vehicle of claim 1, wherein said cabin is positioned so that a view of said aircraft, from said cabin, when said aircraft is attached to said attaching means is unobstructed by said wing beam.

13. The vehicle of claim 1, wherein the left pair and the right pair of engines are all mounted outboard of the aircraft.

14. The vehicle of claim 1, wherein said pivoting means comprises:
   left and right engine mounting members respectively mounting the left and right engine pairs, said engine mounting members being disposed respectively, in left and right cut out areas of the beam; and
   a pivot rod disposed within the beam in an area between the cut out areas and extending through the cut out areas of the beam, said pivot rod being attached to the engine mounting members and when rotated, causing rotation thereof.

15. A composite VTOL vehicle comprising:
   a single aerodynamically shaped beam;
   a left pair and a right pair of engines mounted respectively near the left and right outboard edges of the beam to straddle said beam, said engines including pivoting means by which the engines may be pivoted between a first position in which the engines provide substantially vertical thrust to each side of the beam and a second position in which the engines provide substantially horizontal thrust above and below said beam;
   a centerline mounted cabin attached to the underside of the beam and positioned below said beam;
   an attaching means for releasably attaching an aircraft to the underside of the cabin, said attaching means being adapted to attach the aircraft to be held thereby between the engine pairs; and
   a landing gear means arranged in supportive deployment with respect to the vehicle, the landing gear means being capable of supporting the vehicle at a sufficient height so that the aircraft attached to the underside of the cabin clears a surface on which the vehicle is parked, the landing gear means comprising:
   a left pair and a right pair of legs mounted respectively to the underside of the beam just outside the left pair and right pair of engines, each of said legs having a shock absorber interposed along its length; and
   a left pair and a right pair of wheels connected to the ends of the corresponding legs.

16. The vehicle of claim 15, in which the aircraft is a high performance, jet powered aircraft having no independent landing gear.

17. The vehicle of claim 15, in which the means for pivoting the engines comprises:
   left and right engine mounting members respectively mounting the left and right engine pairs, said engine mounting members being disposed respectively in left and right cut out areas of the beam; and a pivot rod disposed within the beam in an area between the cut out areas and extending through the cut out areas of the beam, said pivot rod being attached to the engine mounting members and when rotated, causing rotation thereof.

18. The vehicle of claim 15, in which the engines are provided with pivotable aerodynamic vanes capable of providing pitch and lateral control to the vehicle when the engines are in the first position, said vanes being further capable of providing pitch and directional control when the engines are in the second position.

19. The vehicle of claim 15, wherein the attaching means comprises:
 a retractable hook and two latching probe receptacles arranged in supportive deployment with respect to the aircraft on an upper surface of the aircraft; and
 a retractable trapeze and two retracable latching probes attached to the underside of the cabin, said trapeze and probes corresponding, respectively, with the hook and probe receptacles.

20. The vehicle of claim 15, wherein the beam is fixed with respect to the vehicle.

* * * * *